(12) United States Patent
Tumu et al.

(10) Patent No.: US 10,985,487 B2
(45) Date of Patent: Apr. 20, 2021

(54) ELECTRICAL CONNECTOR BETWEEN A BUS AND A CIRCUIT BREAKER

(71) Applicant: ABB Schweiz AG, Baden (CH)

(72) Inventors: Nagesh Tumu, Unionville, CT (US); Jamie Wakefield, Windsor, CT (US); Steven Andrew Greenwald, Plainville, CT (US)

(73) Assignee: ABB Schweiz AG, Baden (CH)

( * ) Notice: Subject to any disclaimer, the term of this patent is extended or adjusted under 35 U.S.C. 154(b) by 14 days.

(21) Appl. No.: 16/511,591

(22) Filed: Jul. 15, 2019

(65) Prior Publication Data

US 2021/0021071 A1  Jan. 21, 2021

(51) Int. Cl.
| | |
|---|---|
| *H01R 25/00* | (2006.01) |
| *H01R 13/24* | (2006.01) |
| *H01R 25/14* | (2006.01) |
| *H02B 1/32* | (2006.01) |
| *H01H 71/02* | (2006.01) |
| *H02B 1/20* | (2006.01) |
| *H01R 13/03* | (2006.01) |

(52) U.S. Cl.
CPC ..... *H01R 13/2407* (2013.01); *H01H 71/0264* (2013.01); *H01R 13/03* (2013.01); *H01R 25/142* (2013.01); *H02B 1/20* (2013.01); *H02B 1/32* (2013.01)

(58) Field of Classification Search
CPC ....... H01R 25/14; H01R 25/142; H01R 13/05
USPC .................................................. 110/110, 825
See application file for complete search history.

(56) References Cited

U.S. PATENT DOCUMENTS

| | | | | |
|---|---|---|---|---|
| 995,674 | A * | 6/1911 | Hertzberg | 439/687 |
| 1,531,917 | A * | 3/1925 | French | H01H 1/46 439/247 |
| 2,068,582 | A * | 1/1937 | Von Hoorn | H01H 11/06 200/258 |
| 3,197,599 | A * | 7/1965 | Lingenfelter | H01H 1/44 200/258 |
| 3,605,066 | A * | 9/1971 | Vierck, Sr. | H01R 11/24 439/219 |
| 3,848,948 | A * | 11/1974 | Soes | H01R 13/193 439/252 |

(Continued)

FOREIGN PATENT DOCUMENTS

| | | |
|---|---|---|
| EP | 086316 A2 | 8/1983 |
| EP | 0528503 A2 | 2/1993 |

(Continued)

OTHER PUBLICATIONS

European Patent Office, Extended European Search Report issued in corresponding European application No. 20185918.8, dated Oct. 12, 2020, 11 pages.

*Primary Examiner* — Neil Abrams
(74) *Attorney, Agent, or Firm* — Taft Stettinius & Hollister LLP

(57) ABSTRACT

An electrical connector is provided for electrically coupling two electrical components. Opposing ends of the connector are coupled to each of the electrical components. At the first end, the connector is disposed in an opening of the first electrical component to establish electrical connection. The first end includes multiple contact portions that are equally biased against the sides of the opening.

20 Claims, 9 Drawing Sheets

(56) References Cited

U.S. PATENT DOCUMENTS

| | | | | | |
|---|---|---|---|---|---|
| 4,157,582 | A | * | 6/1979 | Myers | H02B 1/056 |
| | | | | | 361/636 |
| 4,227,596 | A | | 10/1980 | Bartels | |
| 4,416,504 | A | * | 11/1983 | Sochor | H01R 13/05 |
| | | | | | 439/746 |
| 7,314,377 | B2 | * | 1/2008 | Northey | H01R 12/777 |
| | | | | | 439/79 |
| 8,641,432 | B2 | * | 2/2014 | Northey | G09B 19/00 |
| | | | | | 439/116 |
| 8,672,717 | B2 | * | 3/2014 | Li | H01R 4/4872 |
| | | | | | 439/822 |
| 8,764,495 | B2 | * | 7/2014 | Ahangar | H01R 13/052 |
| | | | | | 439/825 |
| 8,926,341 | B2 | * | 1/2015 | Chen | H01R 13/516 |
| | | | | | 439/79 |
| 10,164,387 | B2 | * | 12/2018 | Baillargeon | H01R 25/14 |
| 2014/0160640 | A1 | | 6/2014 | Duda et al. | |

FOREIGN PATENT DOCUMENTS

| | | |
|---|---|---|
| EP | 1914769 A2 | 4/2008 |
| EP | 3059814 A2 | 8/2016 |

* cited by examiner

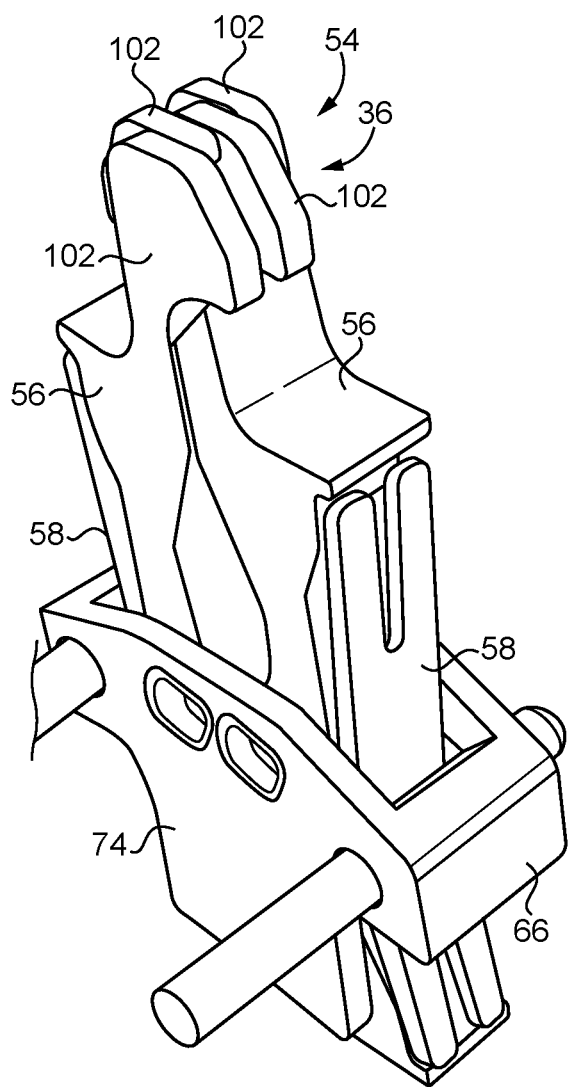
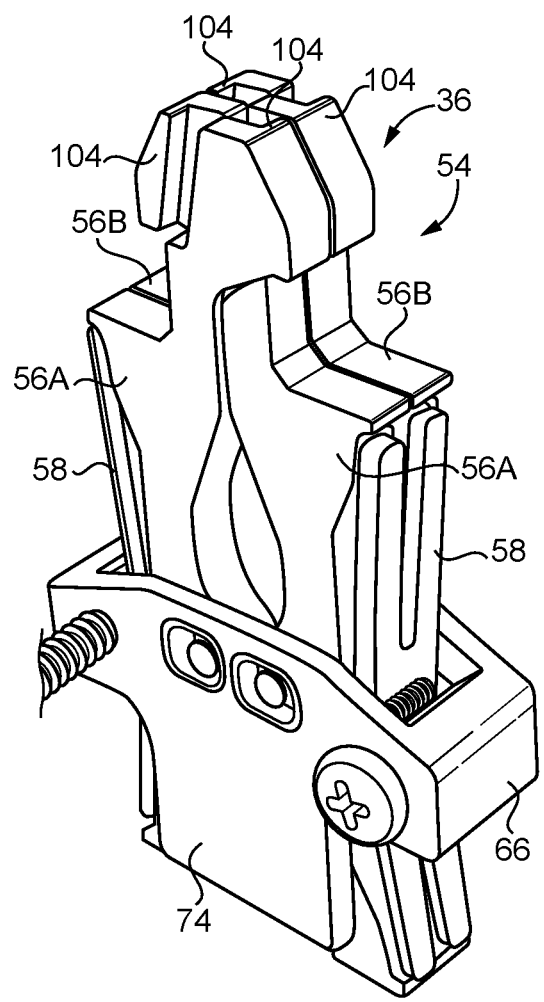
FIG. 10
FIG. 11

ELECTRICAL CONNECTOR BETWEEN A BUS AND A CIRCUIT BREAKER

BACKGROUND

The present inventions relate generally to an electrical connector, and more particularly, to an electrical connector coupling first and second electrical components together.

Typically, industrial facilities are provided with one or more power supply panels 10 to distribute electrical power throughout the industrial facility. An example of a power supply panel 10 is shown in FIG. 1. As shown, the panel 10 includes an electrical box 12. Within the box 12, mounting structures 14 are also provided to mount a power supply bus 16 and a series of circuit breakers 18. Power is supplied to the bus 16 with one or more lugs 20 which are connected to electrical power supply cables and to the bus 16. The circuit breakers 18 are electrically connected to the bus 16 with an electrical connector 34 described in more detail below. Electrical cables are also connected to each circuit breaker 18 to supply electrical power to various electrical circuits throughout the industrial facility. Commonly, the total electrical capability of the power supply panel (i.e., the bus 16) is required to be within 150 A to 1,200 A. It is understood that the box 12 may also contain a variety of other electrical accessories in addition to the power supply bus 16 and circuit breakers 18. Although the described arrangement may be used with a single phase system, the illustrated system is a three-phase system. Thus, three lugs 20 are provided to supply power; three connecting slots 22 are provided in the bus 16; and each circuit breaker 18 has three output connectors 24. Although not shown in FIG. 1, a cover is typically provided to enclose the bus 16 and other electrical hardware within the box 12.

SUMMARY

An electrical connector is described for connecting a circuit breaker to a power supply bus. The power supply bus has an opening through which the connector is inserted to establish an electrical connection. The electrical connector includes first and second contact portions that contact first and second sides of the opening. A spring applies a bias force to the contact portions to apply equal pressure by the contact portions against the sides of the opening.

BRIEF DESCRIPTION OF SEVERAL VIEWS OF THE DRAWINGS

The invention may be more fully understood by reading the following description in conjunction with the drawings, in which:

FIG. 10 is a perspective view of another embodiment of the electrical connector;

FIG. 11 is a perspective view of another embodiment of the electrical connector;

DETAILED DESCRIPTION

Figure 2:
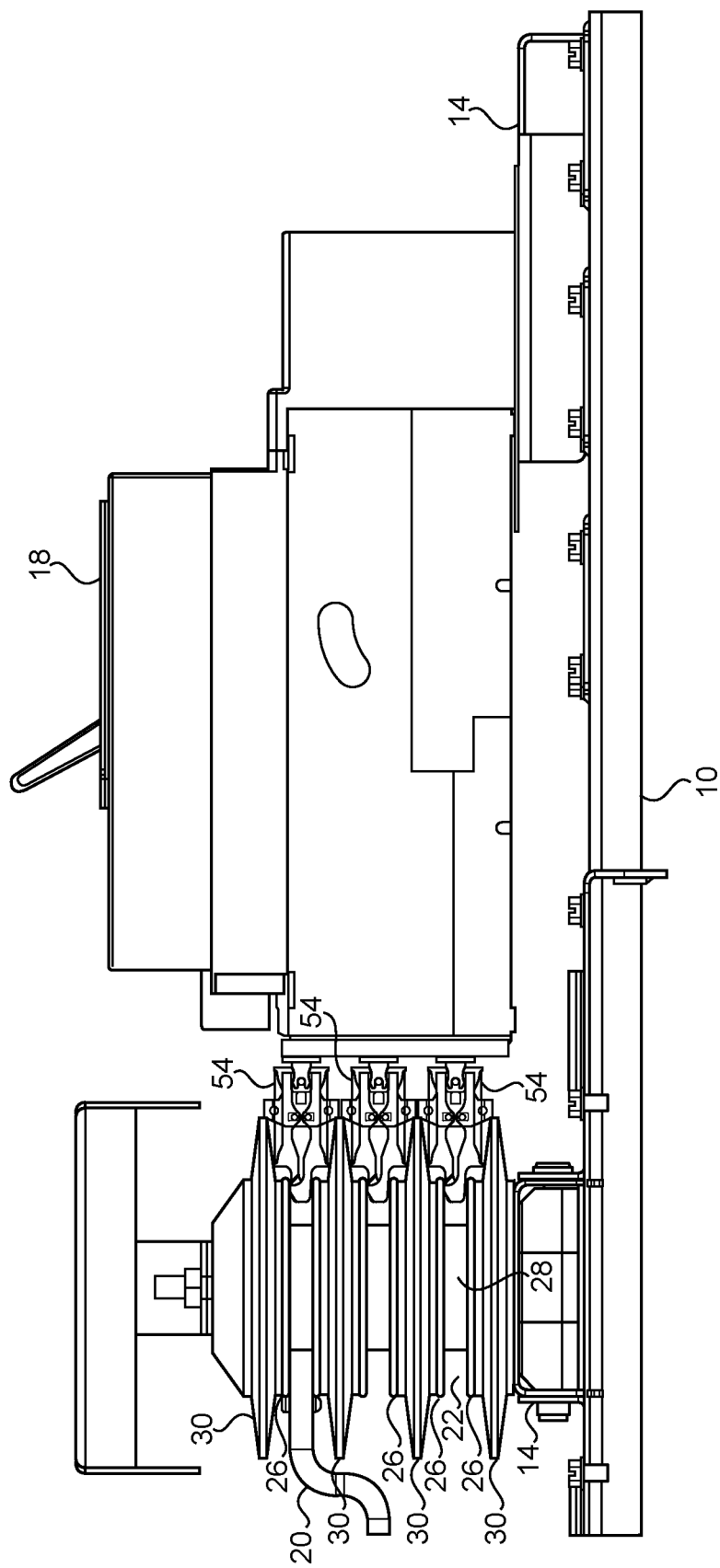
FIG. 2 is a side view of a power supply bus, circuit breaker and electrical connectors therebetween.

Improved electrical connectors 54 are shown in FIG. 2. As shown, the circuit breaker 18 and bus 16 are mounted to the base 14 of the box 12. The bus 16 is preferably a stacked arrangement with a connecting slot 22 (i.e., an opening 22) between two contact plates 26 for each phase. The contact plates 26 are separated from each other with a spacer 28. In high amperage applications, it is preferred that both contact plates 26 defining a slot 22 are made of a conductive material like copper and the spacer 28 therebetween is also conductive. It is understood that other electrically conductive materials may also be used including, for example, aluminum. However, it may be possible in lower amperage applications for only one of the two plates 26 to be conductive and for the spacer 28 and the other plate 26 to be made of an insulative material. On the top and bottom of each plate 26, an insulated plate 30 is preferably provided. The insulated plate 30 may be made of fiber reinforced plastic. As shown, the insulated plates 30 preferably include an extension portion 32 (FIG. 9) that extends outward beyond the respective plate 26 and covers a portion of the respective connector 54.

As shown, three electrical connectors 54 are provided between the bus 16 and the circuit breaker 18, since the illustrated system is a three-phase system. In a single phase system, there would only be one connector 54 between the bus 16 and the circuit breaker 18. The connector 54 may be used with a variety of circuit breakers 18 having 1, 2, 3 or 4 poles. Each connector 54 is coupled at a first end 36 to a respective connecting slot 22 of the bus 16 and at a second end 38 to the circuit breaker 18. In use, the connectors 54 are preferably attached to the circuit breaker 18 by the manufacturer and supplied with the circuit breaker 18. When the circuit breaker 18 is installed into the box 12, the first end 36 of each connector 54 slides into the respective connecting slot 22 of the bus 16 to electrically interconnect the bus 16 and the circuit breaker 18.

Figure 3:
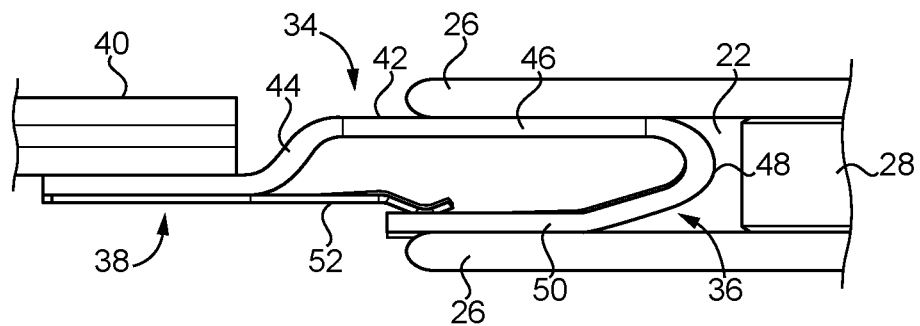
FIG. 3 is a side view of a prior art electrical connector.

A prior art connector 34 is shown in FIG. 3. As shown, the connector 34 is rigidly attached at the second end 38 to a bar 40. Although not illustrated, the bar 40 is attached to the circuit breaker 18 with bolts, rivets or some other type of rigid connection. The first end 36 slides into the connection slot 22 in the power supply bus 16 as described above. The main body 42 of the connector 34 is bent 44 upwards from the second end 38 to a flat section 46 that is parallel to one of the contact plates 26. At the first end 36, the main body 42 is bent again 48 downward toward the other contact plate 26 to another flat section 50 that is parallel to the other contact plate 26. A cantilevered spring 52 is also provided that is rigidly attached to the second end 38 and contacts the inner side of the second flat section 50 to apply an outward force thereto.

One aspect of the prior art connector 34 is that the geometry of the connector 34, in addition to the current path, is used to apply force against the contact plates 26 to make contact and transfer the required amount of current. The cross-section of the connector 34 is designed to limit temperature rise in accordance with the standards of certifying organizations. However, in designing the connector 34 to satisfy limits on temperature rise by limiting current density through the connector 34, it is possible that a high contact force against the contact plates 26 may occur which can increase the force required to install the connector 34 (i.e., insert it into the slot 22 between the contact plates 26). In addition, a temperature rise beyond a certain threshold can reduce the contact force of the connector 34 against the contact plates 26, which can increase electrical resistance to conducting current. Thus, improvements in thermal performance without compromising the installation force of the connector 34 would be desirable.

Figure 4:
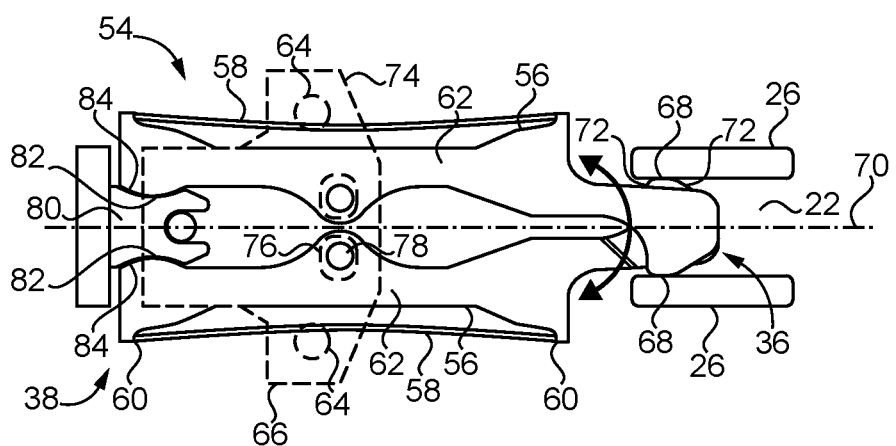
FIG. 4 is a side view of a new electrical connector.

A new connector 54 is shown in FIG. 4. The connector 54 includes two arms 56 that are biased against each other by one or more springs 58. In the embodiment of FIG. 4, the spring force is applied with two leaf springs 58 that apply pressure to the outsides of the respective arms 56. That is, each spring 58 contacts a pair of spring seats 60 on the outside of the body portion 62 of the respective arm 56. The leaf spring 58 also contacts the inside of a pin 64 in the housing 66 along the center of the leaf spring 58. Thus, the leaf spring 58 is biased at the ends against the respective arm 56 and in the middle against the housing 66. As a result, the two arms 56 are forced against each other by the leaf springs 58. Preferably, the arms 56 are made of copper and the springs 58 are made of high tensile steel. Aluminum or another electrically conductive material may also be used.

As described above, the first end 36 is electrically coupled to the connection slot 22 (i.e., opening 22) of the power supply bus 16. Thus, the parallel plates 26 of the bus 16 on opposite sides of the slot 22 form an electrical contact which the first end 36 contacts when inserted into the slot 22. Specifically, each arm 56 includes a contact portion 68 at the first end 36 to contact one of the plates 26. That is, the contact portion 68 of one of the arms 56 is pressed against one of the plates 26 (i.e., a side of the opening 22), and the contact portion 68 of the other arm 56 is pressed against the other plate 26 (i.e., the other side of the opening 22). The arms 56 are also arranged in a scissor fashion such that the arms 56 cross each other between the second end 38 and the contact portions 68 at the first end 36. More specifically, each arm 56 includes a body portion 62 which the leaf spring 58 presses against to apply the bias force. The body portion 62 of the arm 56 is located on one side of a centerline 70 drawn through the connector 54. Between the body portion 62 and the respective contact portion 68 (or between the spring 58 and the contact portion 68), the arms 56 cross each other such that the contact portion 68 of an arm 56 is on the other side of the centerline 70 from the respective body portion 62. Thus, the arm 56 contacts the bus plate 26 on the opposite side of the centerline 70 from the respective body portion 62 and respective second end 38. As a result, the first end 36 applies equal pressure against the connection slot 22 to ensure solid contact between the contact portions 68 and the respective plates 26. It may also be desirable for the first end 36 of each arm 56 to be provided with angled or rounded surfaces 72 next to the contact portion 68 to allow the first end 36 to be easily inserted and withdrawn from the connection slot 22.

Figure 12:
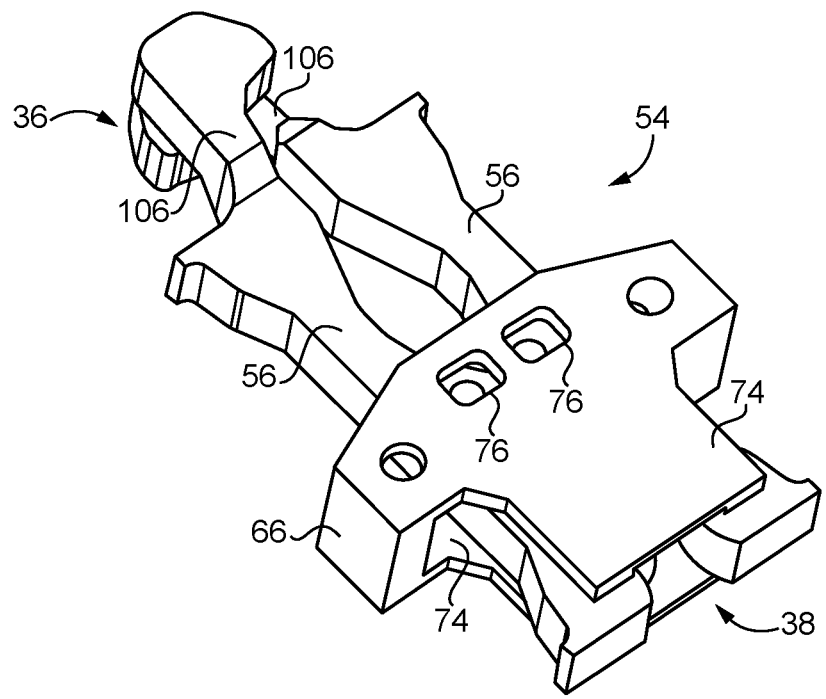
FIG. 12 is a perspective view of another embodiment of the electrical connector.

Preferably, the housing 66 restrains the two arms 56 within the housing 66. For example, as shown in FIG. 12, the housing 66 may have two plates 74 on opposite sides of the arms 56 that are attached together. The housing 66 and arms 56 may also be engaged with each other to permit limited movement of the arms 56 toward and away from each other. That is, in the example of FIG. 4, the housing 66 may have a slotted opening 76 for each arm 56 within which a pin 78 of the respective arm 56 is located. Thus, the arm 56 is allowed to move toward and away from the other arm 56 until the arm pin 78 contacts the ends of the respective slot 76.

The second end 38 of the connector 54 is electrically coupled to the circuit breaker 18 as noted above. Preferably, the circuit breaker 18 is provided with an extension contact 80 that is bolted to, riveted to or otherwise rigidly attached to the circuit breaker 18. As shown in FIG. 4, the extension contact 80 may include a rounded surface 82 on each side of the contact 80. The body portion 62 of each arm 56 may also be provided with a corresponding rounded contact portion 84 at the second end 38 of the connector 54. Due to the spring pressure of the springs 58, the rounded contact portions 84 of the arms 56 are biased against the respective rounded surface 82 of the extension contact 80. In contrast to the first end 36 where the contact portions 68 are on the opposite side of the centerline 70 from the body portion 62, the rounded contact portions 84 of the second end 38 are on the same side of the centerline 70 as the respective body portion 62. Thus, for each arm 56, the contact portion 68 of the first end 36 and the rounded contact portion 84 of the second end 38 are on opposite sides of the centerline 70.

One advantage of the connector 54 is that the cross-section carrying electrical current is independent of the contact force applied against the contact plates 26. Thus, the current density may be much less than in the prior art connector 34 without effecting the contact force. As a result, the temperature rise may be less. Beneficially, the pressure of the first end 36 of the connector 54 against the plates 26 is not dependent on the shape, thickness and material properties of the connector 54. Instead, the connection pressure of the first end 36 is supplied by the pressure of the springs 58 against the arms 56. Thus, the arms 56 may be optimized for current flow without negatively affecting the connection pressure of the first end 36 of the connector 54 against the bus plates 26.

Figure 5A:
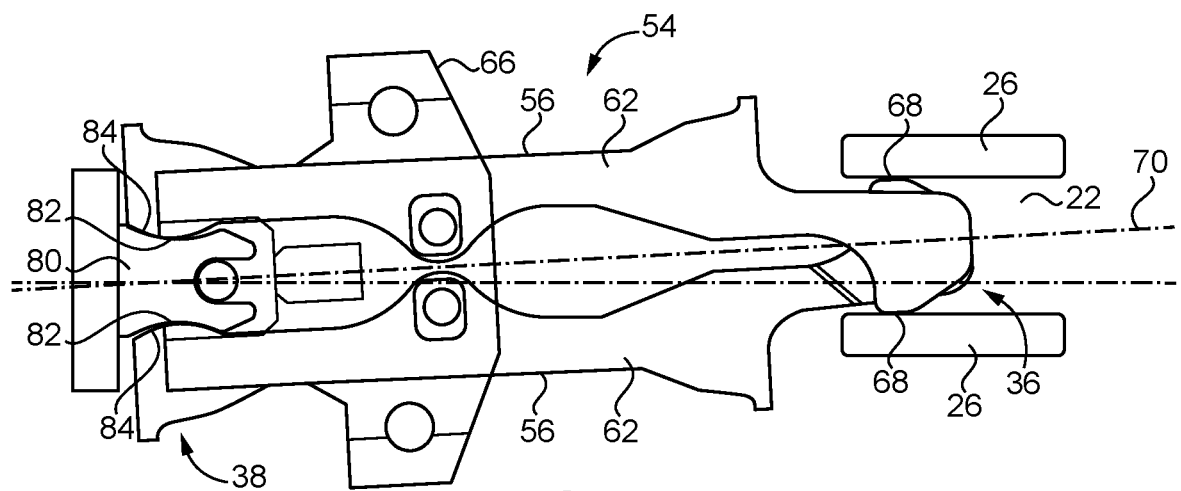
FIGS. 5A-5C are side views of the electrical connector, showing various alignments between the circuit breaker and the power supply bus.
Figure 5B:
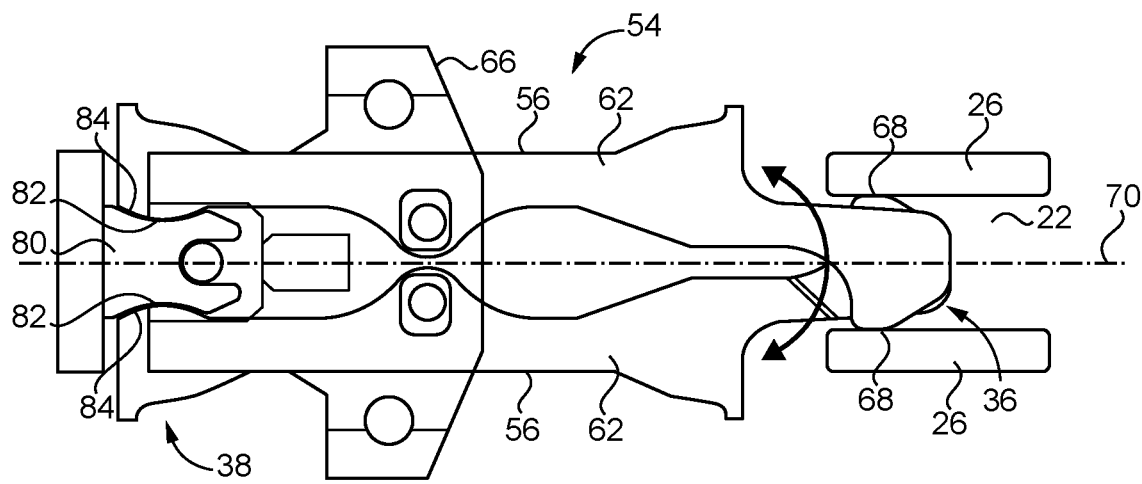
Figure 5C:
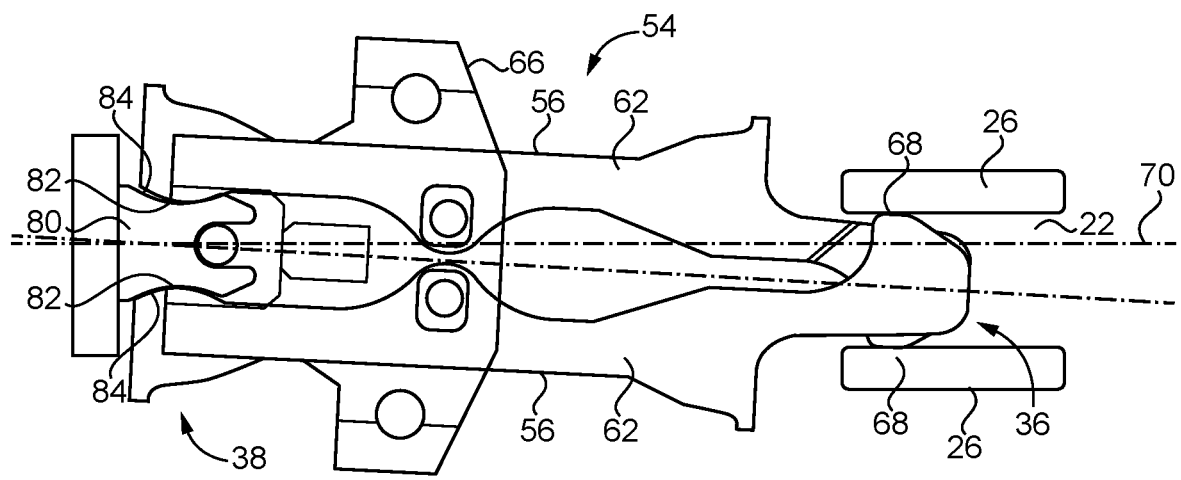

Another advantage of the connector 54 is shown in FIGS. 5A-5C. Due to manufacturing tolerances and other possible reasons, it is possible for the circuit breaker 18 to be slightly misaligned from the power supply bus 16. Straight alignment between the circuit breaker 18 (i.e., extension contact 80) and the bus 16 (i.e., slot 22) is illustrated in FIG. 5B. However, as illustrated in FIGS. 5A and 5C, the circuit breaker 18 may be misaligned in either of at least two directions from the bus 16. Nevertheless, the connector 54 maintains good contact with the contact plates 26 of the bus 16 and the extension contact 80 of the circuit breaker 18. This is due to the independent spring-loaded contact portions 68 and rounded contact portions 84 of the first and second ends 36, 38, respectively. Further, due to the rounded engagement at the second end 38 between the rounded contact portions 84 of the arms 56 and rounded sides 82 of the extension contact 80, the connector 54 is able to pivot relative to the circuit breaker 18 to accommodate misalignment between the circuit breaker 18 and the bus 16.

Figure 6:
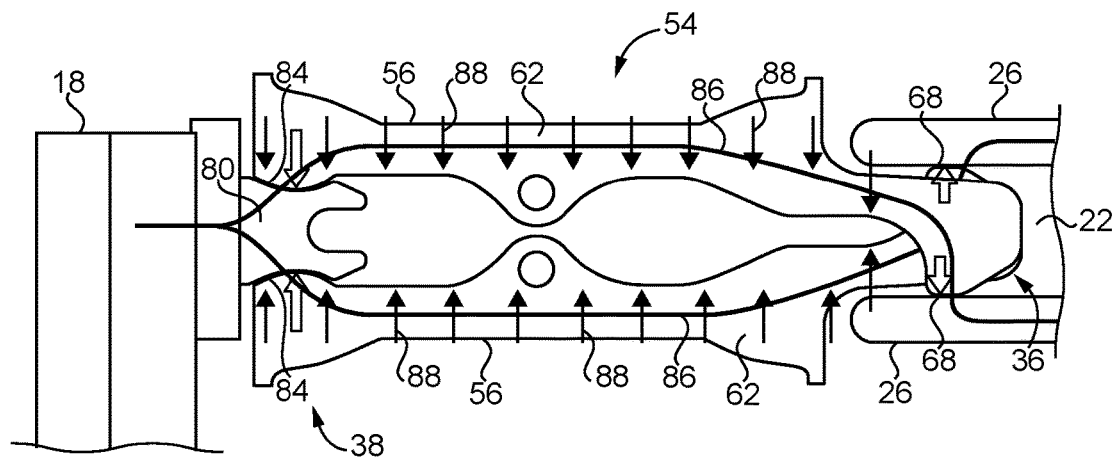
FIG. 6 is a side view of the electrical connector, showing magnetic fields generated by electrical current.

Another advantage of the connector 54 is shown in FIG. 6. During high current transmissions (e.g., short-circuits before the circuit breaker 18 opens), the current flow 86 generates magnetic fields 88. However, in the connector 54 the magnetic fields 88 cause the arms 56 to be pulled towards each other. As a result, the arms 56 engage more tightly against both the contact plates 26 and extension contact 80 during such an event instead of pulling away which may be the case in some alternative designs.

Figure 7:
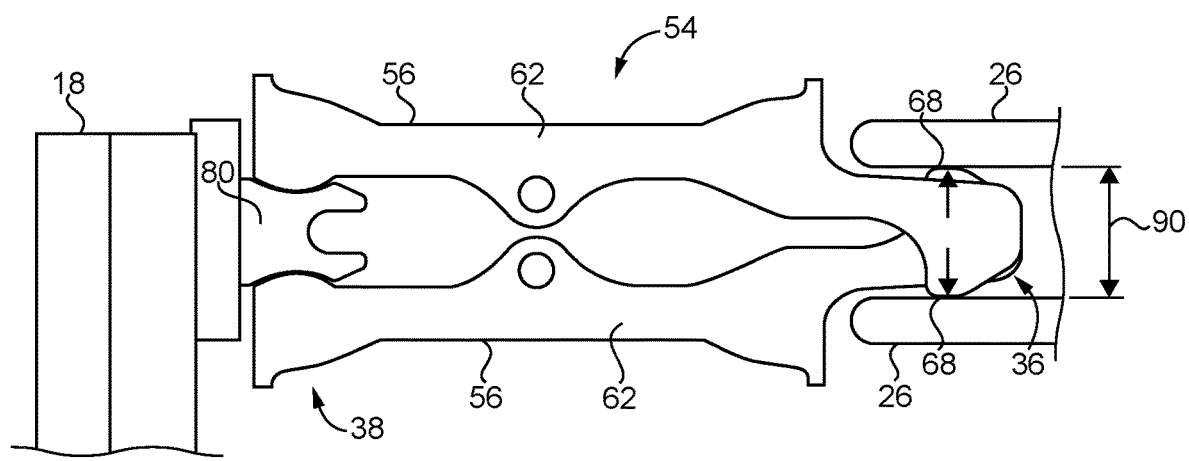
FIG. 7 is a side view of the electrical connector, showing the gap distance between the contact plates of the power supply bus.
Figure 8:
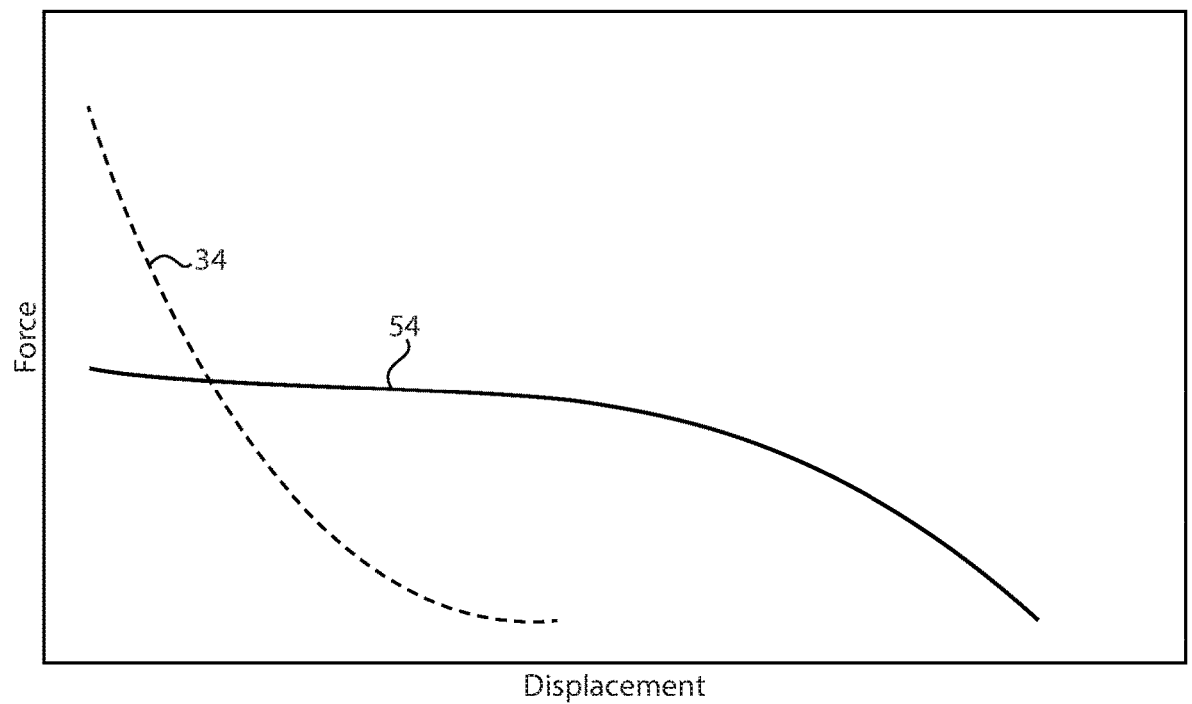
FIG. 8 is a chart showing the force applied by the contact portions of the electrical connector against the plates of the bus for different gap distances between the plates.

Another advantage of the connector 54 is shown in FIGS. 7 and 8. In FIG. 7, the gap distance 90 between the contact plates 26 is labeled. As described above, the contact portions 68 of the connector 54 press against the contact plates 26 to electrically couple the first end 36 of the connector 54 to the bus 16. However, it is not possible to manufacture the gap distance 90 to be exactly the same in every manufactured power supply bus 16. That is, according to manufacturing tolerances, the actual size 90 of the gap 22 can vary from being larger than nominal to being smaller than nominal. In FIG. 8, the force applied by two connectors 34, 54 against the contact plates 26 versus gap distance 90 is shown. As shown, the force applied by the prior art connector 34 is very high when the gap 22 is small and drops quickly as the gap size 90 increases. The tolerance range and nominal gap size 90 that is necessary to keep the force of the prior art connector 34 against the contact plates 26 within an acceptable range is small. By contrast, the force applied by the new connector 54 is much more constant across a wide range of gap sizes 90. Thus, the new connector 54 makes the gap size 90 much less of a critical feature for proper functioning of the electrical connection between the circuit breaker 18 and the bus 16.

Figure 1:
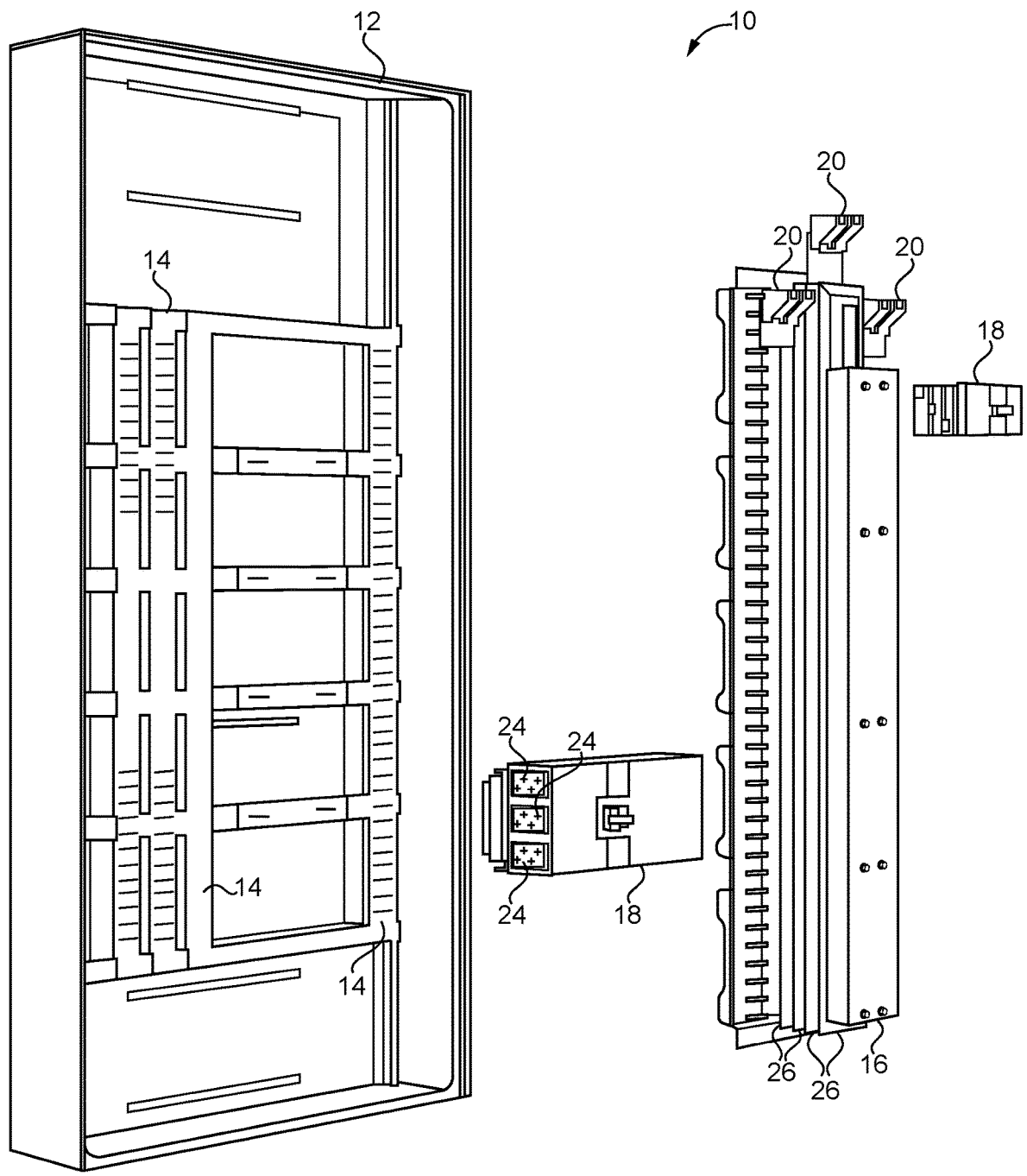
FIG. 1 is an exploded view of a power supply panel.
Figure 9:
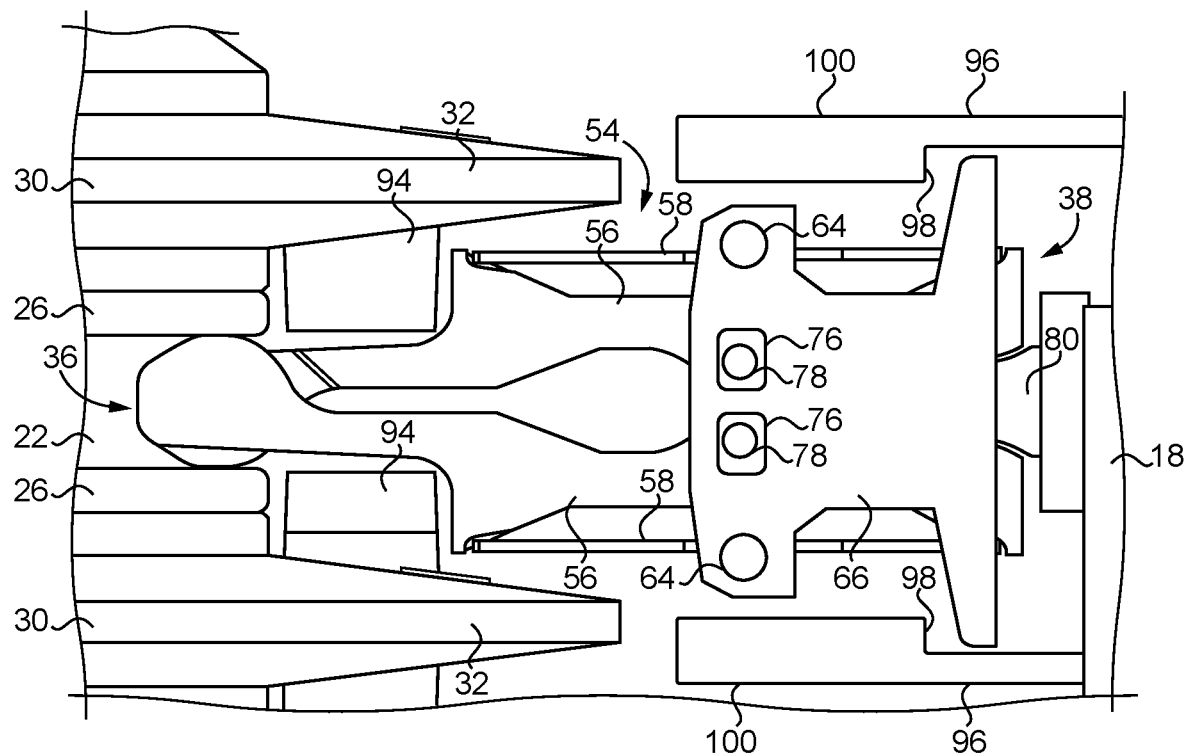
FIG. 9 is an enlarged view of the electrical connector, power supply bus and circuit breaker.

Another possible feature of the circuit breaker 18 and power supply bus 16 arrangement is shown in FIG. 9. In order to prevent operators from inadvertently touching electrically charged hardware (e.g., with a hand or finger) inside of the electrical box 12, various features may be provided to cover the conductive surfaces. One useful feature is transverse insulated extensions 94 that overlap the ends of the contact plates 26. As understood from FIG. 1, the transverse extensions 94 extend along the length of the power supply bus 16. Thus, in areas of the bus 16 where a circuit breaker 18 is not connected, an operator could potentially access the contact plates 26 through the space between the insulated plates 30. However, the transverse extensions 94 significantly reduce access to the plates 26. This feature is more easily adapted to the new connector 54 since the first end 36 can be lengthened to reach through the transverse extensions 92 and contact the plates 26. Any needed bias force changes may be easily adjusted by altering the tension of the springs 58. By contrast, it would be more difficult to alter the prior art connector 34 for this arrangement while maintaining the necessary contact force against the plates 26.

Also illustrated in FIG. 9, are insulated housing portions 96 of the circuit breaker 18. As shown, the housing 96 may have retention structures 98 that keep the connector 54 attached to the circuit breaker 18 while allowing the pivoting motion of the connector 54 described above. The housing 96 may also have a longitudinal section 100 that surrounds the outer region of the springs 58 and the connector housing 66 to prevent operators from touching the connector 54 when it is connected to the power supply bus 16.

Figure 13A:
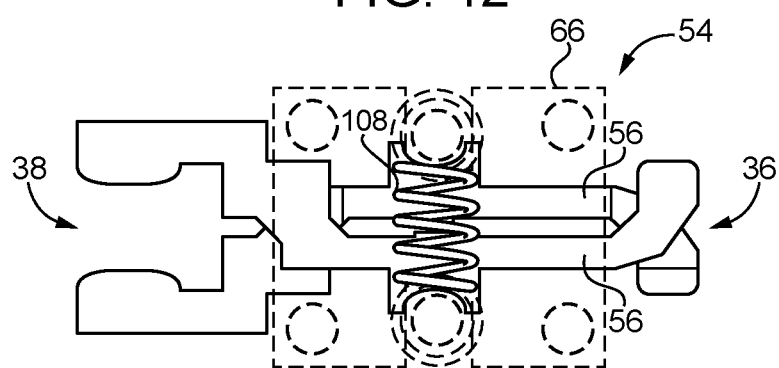
FIGS. 13A-13B include a side view and a perspective view of another embodiment of the electrical connector including a tension spring.
Figure 13B:
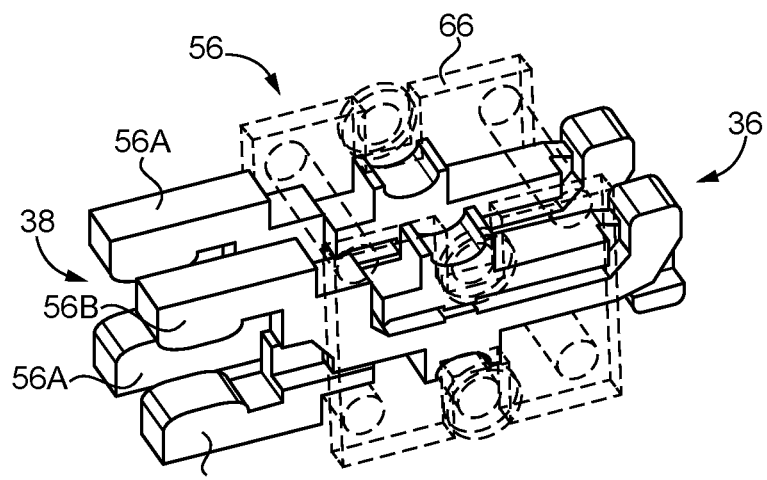

FIGS. 10-13B show further alternative embodiments of the electrical connector 54. As shown in FIG. 10, each of the first ends 36 of the arms 56 may be provided with multiple segments 102 that are interleaved with corresponding segments 102 of the other arm 56. As shown in FIG. 11, each arm 56 may be composed of two arms 56A, 56B arranged side-by-side. Also, the contact portion 68 of each arm 56 may be widened to overlap 104 the width of the other arm 56. As shown in FIG. 12, each of the first ends 36 of the arms 56 may be offset 106 from each other to accommodate the crossing of the two arms 56. The connector housing 66 is also shown surrounding the arms 56 to restrain the arms 56 therein. In FIGS. 13A-13B, the function of the arms 56 and housing 66 are similar to the embodiments described above even though the form of the arms 56 and housing 66 vary from the other embodiments. One difference, however, is that a tension spring 108 may be used between the arms 56 to bias the arms 56 together instead of the leaf springs 58 described above.

While preferred embodiments of the inventions have been described, it should be understood that the inventions are not so limited, and modifications may be made without departing from the inventions herein. While each embodiment described herein may refer only to certain features and may not specifically refer to every feature described with respect to other embodiments, it should be recognized that the features described herein are interchangeable unless described otherwise, even where no reference is made to a specific feature. It should also be understood that the advantages described above are not necessarily the only advantages of the inventions, and it is not necessarily expected that all of the described advantages will be achieved with every embodiment of the inventions. The scope of the inventions is defined by the appended claims, and all devices and methods that come within the meaning of the claims, either literally or by equivalence, are intended to be embraced therein.

The invention claimed is:

1. An electrical connector electrically coupling a first electrical component and a second electrical component, comprising:
    a first end electrically coupled to the first electrical component;
    a second end electrically coupled to the second electrical component;
    the first electrical component comprising an opening defining an electrical contact;
    the first end being disposed within the opening and comprising first and second contact portions, the first contact portion being biased against a first side of the opening, and the second contact portion being biased against a second side of the opening, the first end thereby applying equal pressure against the opening; and
    two arms and a spring biasing the two arms together, the first contact portion being a portion of one of the two arms and the second contact portion being a portion of another of the two arms;
    wherein each arm comprises a body portion and the spring comprises one or more springs engaged with the body portion of each arm to bias the two arms together, the body portion of each arm being disposed on an opposite side of a centerline through the electrical connector from the respective first and second contact portions, the two arms thereby crossing each other between the one or more springs and the first and second contact portions.

2. The electrical connector according to claim 1, wherein the first electrical component is a power supply bus.

3. The electrical connector according to claim 2, wherein the second electrical component is a circuit breaker.

4. The electrical connector according to claim 3, wherein the power supply bus is a three phase power supply bus and the circuit breaker is a three phase circuit breaker, and comprising three of the electrical connectors, each of the electrical connectors electrically coupling one of the three phases between the power supply bus and the circuit breaker.

5. The electrical connector according to claim 4, wherein the opening of the first electrical component is a space between two parallel plates, the two parallel plates comprising the first and second sides of the opening.

6. The electrical connector according to claim 5, wherein the power supply bus comprises an insulated plate disposed over at least one of the parallel plates, the insulated plate comprising an extension portion extending outward beyond the parallel plate, the two arms being made of copper or aluminum, and the spring being made of steel.

7. The electrical connector according to claim 1, wherein the opening of the first electrical component is a space between two parallel plates, the two parallel plates comprising the first and second sides of the opening.

8. The electrical connector according to claim 7, wherein the first electrical component is a power supply bus with an insulated plate disposed over at least one of the parallel plates, the insulated plate comprising an extension portion extending outward beyond the parallel plate and a transverse extension overlapping an end of the parallel plate.

9. The electrical connector according to claim 1, wherein the two arms are made of copper or aluminum.

10. The electrical connector according to claim 9, wherein the spring is made of steel.

11. The electrical connector according to claim 1, wherein the spring comprises two leaf springs, one of the leaf springs being disposed on an outside of each arm.

12. The electrical connector according to claim 1, further comprising a housing, the two arms being restrained within the housing.

13. The electrical connector according to claim 12, wherein the spring comprises two springs, each of the two springs being biased between the housing and one of the two arms.

14. An electrical connector electrically coupling a first electrical component and a second electrical component, comprising:
  a first end electrically coupled to the first electrical component;
  a second end electrically coupled to the second electrical component;
  the first electrical component comprising an opening defining an electrical contact; and
  the first end being disposed within the opening and comprising first and second contact portions, the first contact portion being biased against a first side of the opening, and the second contact portion being biased against a second side of the opening, the first end thereby applying equal pressure against the opening;
  wherein the second electrical component comprises an extension contact with a rounded surface on each of two sides thereof, and the second end comprises first and second rounded contact portions, the first rounded contact portion being biased against one of the rounded surfaces of the extension contact, and the second rounded contact portion being biased against another of the rounded surfaces of the extension contact, the second end thereby being pivotable around the extension contact.

15. The electrical connector according to claim 14, further comprising two arms and a spring biasing the two arms together, the first contact portion and first rounded contact portion being portions of one of the two arms and the second contact portion and second rounded contact portion being portions of another of the two arms.

16. The electrical connector according to claim 15, wherein each arm comprises a body portion and the spring comprises one or more springs engaged with the body portion of each arm to bias the two arms together, the body portion of each arm being disposed on an opposite side of a centerline through the electrical connector from the respective first and second contact portions, the two arms thereby crossing each other between the one or more springs and the first and second contact portions.

17. The electrical connector according to claim 16, wherein the first and second rounded contact portions of each respective arm is disposed on a same side of the centerline as the respective body portion.

18. The electrical connector according to claim 17, wherein the first electrical component is a power supply bus, and the second electrical component is a circuit breaker.

19. The electrical connector according to claim 18, wherein the power supply bus is a three phase power supply bus and the circuit breaker is a three phase circuit breaker, and comprising three of the electrical connectors, each of the electrical connectors electrically coupling one of the three phases between the power supply bus and the circuit breaker, wherein the opening of the first electrical component is a space between two parallel plates, the two parallel plates comprising the first and second sides of the opening.

20. The electrical connector according to claim 19, wherein the two arms are made of copper or aluminum, the spring is made of steel, the spring comprises two leaf springs, one of the leaf springs being disposed on an outside of each arm, and further comprising a housing, the two arms being restrained within the housing, and each of the two leaf springs being biased between the housing and one of the two arms.

* * * * *